(12) United States Patent
Mosby et al.

(10) Patent No.: US 10,047,789 B1
(45) Date of Patent: Aug. 14, 2018

(54) LOCKING PIVOT JOINT

(71) Applicant: MS. CARITA SAFETRUCK, INC, Livermore, CA (US)

(72) Inventors: Gordon E. Mosby, Tracy, CA (US); Robin Wu, Jiangsu (CN)

(73) Assignee: MS. CARITA SAFETRUCK, INC, Livermore, CA (US)

( * ) Notice: Subject to any disclaimer, the term of this patent is extended or adjusted under 35 U.S.C. 154(b) by 0 days.

(21) Appl. No.: 15/588,540

(22) Filed: May 5, 2017

(51) Int. Cl.
*E05D 11/10* (2006.01)
*F16C 11/10* (2006.01)
*G05G 1/02* (2006.01)

(52) U.S. Cl.
CPC .............. *F16C 11/10* (2013.01); *G05G 1/02* (2013.01)

(58) Field of Classification Search
CPC ............ E05D 11/1007; E05D 11/1028; E05D 11/1078; E05D 2011/10; E05D 2011/1028; E05D 2011/1035; E05D 2011/1092; E05D 15/502; F16C 11/10; G05G 1/02; Y10T 16/54024; Y10T 16/540247; Y10T 16/54025; Y10T 16/540253; Y10T 16/540256; Y10T 16/540257; Y10T 16/5409; Y10T 16/54095; Y10T 403/32336; Y10T 403/32344; Y10T 403/32361; Y10T 403/32368
See application file for complete search history.

(56) References Cited

U.S. PATENT DOCUMENTS

| | | | | | |
|---|---|---|---|---|---|
| 3,049,747 | A | * | 8/1962 | McDonald | E05D 5/02 16/389 |
| 4,929,113 | A | * | 5/1990 | Sheu | F16C 11/045 403/157 |
| 5,039,118 | A | * | 8/1991 | Huang | B62B 9/20 280/47.371 |
| 5,056,805 | A | * | 10/1991 | Wang | B62B 9/20 280/47.36 |
| 5,123,768 | A | | 6/1992 | Franklin | |
| 5,168,601 | A | * | 12/1992 | Liu | B62B 9/20 16/329 |

(Continued)

FOREIGN PATENT DOCUMENTS

| GB | 685741 | A | * | 1/1953 | ............... | A61B 1/06 |
|---|---|---|---|---|---|---|
| JP | 3042536 | | | 10/1997 | | |

OTHER PUBLICATIONS

"Push Button Activation," ALT Adjustable Locking Technologies, http://adjustablelockingtech.com/products_variloc_activation_push_button.php (Last Accessed on Mar. 27, 2017) 1pg.

*Primary Examiner* — Chuck Y Mah
(74) *Attorney, Agent, or Firm* — Richard C. Litman

(57) ABSTRACT

The lockable pivot joint can be connected to separate, first and second shaft members to facilitate pivotable connection of the shaft members. The pivot joint includes a first joint member and a second joint member pivotally connected to the first joint member. A push-button assembly for locking and un-locking the pivot joint in a plurality of positions, is connected to the members. The push-button assembly includes an elongate shank having a button at one end. A lobed member is attached to the first end of the shank and a retainer member is positioned in communicating relation with the elongate shank to secure the lobed member on the elongate shank. A biasing member is positioned between the button and the second joint member.

9 Claims, 5 Drawing Sheets

(56) References Cited

U.S. PATENT DOCUMENTS

| | | | | |
|---|---|---|---|---|
| 5,542,151 A | * | 8/1996 | Stranski | A47D 13/063 16/326 |
| 5,617,592 A | * | 4/1997 | Cheng | A47D 13/063 16/326 |
| 5,765,958 A | * | 6/1998 | Lan | B62B 7/06 403/84 |
| 6,629,801 B2 | * | 10/2003 | Cheng | B62B 9/20 280/642 |
| 7,591,604 B2 | | 9/2009 | Roberts | |
| 7,617,569 B2 | * | 11/2009 | Liao | B62B 3/12 16/297 |
| 7,631,575 B2 | * | 12/2009 | Gard | F16C 11/10 74/530 |
| 8,132,978 B2 | | 3/2012 | Franklin et al. | |
| 8,898,862 B1 | * | 12/2014 | McGrath | E05D 11/1007 16/326 |
| 2002/0131814 A1 | * | 9/2002 | Hou | B62B 9/20 403/97 |
| 2004/0179891 A1 | | 9/2004 | Watkins | |
| 2008/0196559 A1 | | 8/2008 | Allan | |

\* cited by examiner

LOCKING PIVOT JOINT

BACKGROUND OF THE INVENTION

1. Field of the Invention

The present invention relates to pivotable, lockable joints, and particularly to an articulating, lockable and unlockable joint with push button release.

2. Description of the Related Art

There are many examples of pivot joints in the marketplace today for pivotably joining separate shaft or rod-like members. Most existing products include two halves fastened together which pivot about a particular point. Some of these products include a locking mechanism which, when released, allows the pivot joint to move about a particular point. However, many devices which include conventional pivot joints are cumbersome or difficult to operate.

Thus, a locking pivot joint solving the aforementioned problems is desired.

SUMMARY OF THE INVENTION

The lockable pivot joint includes a first joint member and a second joint member pivotally connected to the first joint member. A push-button assembly, such as a spring-biased release mechanism, for locking and un-locking the pivot joint in a plurality of positions, is connected to the members. The push-button assembly includes an elongate shank having a button at one end. A lobed member is attached to the first end of the shank and a retainer member is positioned in communicating relation with the elongate shank to secure the lobed member on the elongate shank. A biasing member is positioned between the button and the second joint member. Rotation of the shafts is enabled when the button is depressed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
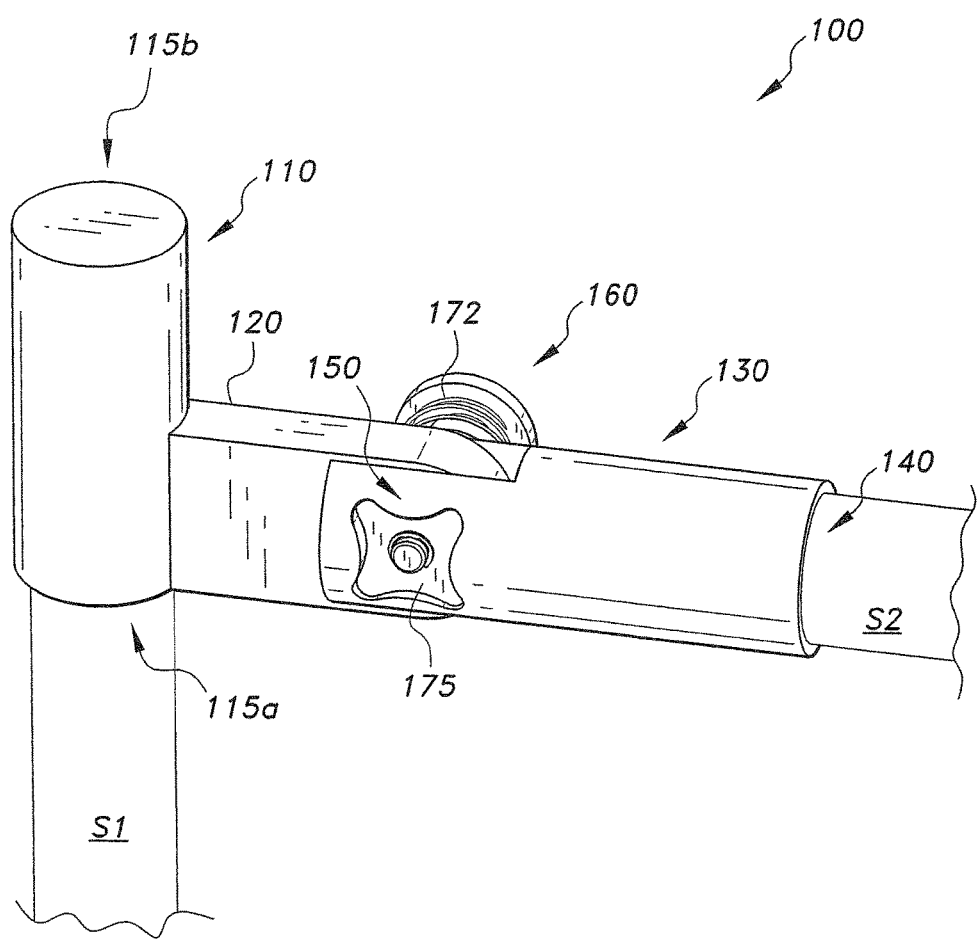
FIG. 1 is an environmental, perspective view of a locking pivot joint with push button release, according to the present invention.
Figure 2:
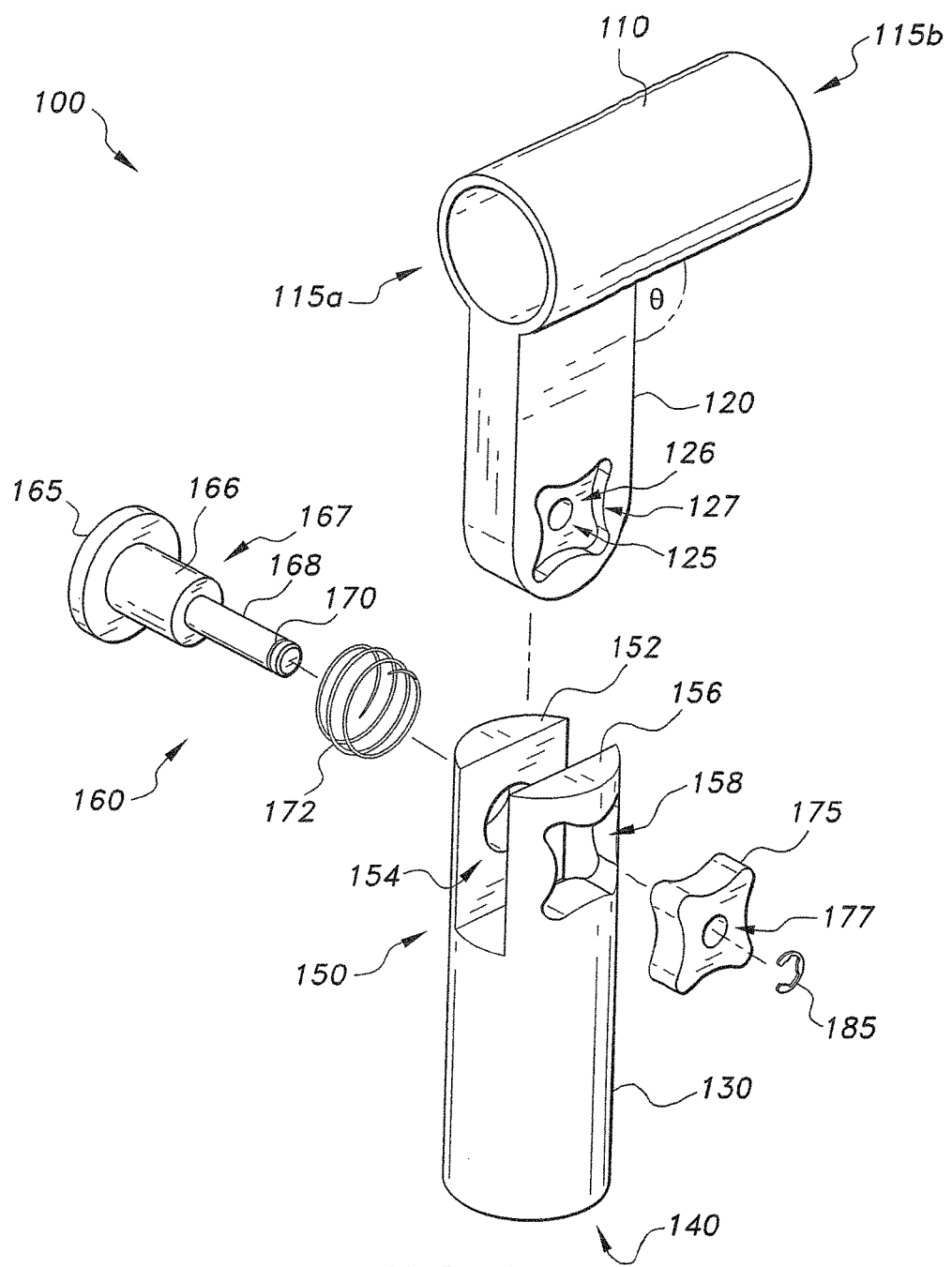
FIG. 2 is an exploded view of the locking pivot joint, illustrating the components of the locking pivot joint, according to the present invention.

Referring to FIGS. 1-3C, a lockable pivot joint 100, is generally illustrated. The lockable pivot joint 100 is configured for connecting ends of separate shafts or shaft-like members S1 and S2, and permits relative angular movement and adjustment between the connected members. The lockable pivot joint 100 includes a first joint member 110 and a second joint member 130, the second joint member 130 being pivotally connected to the first joint member 110. The first joint member 110 and the second joint member 130 have a male-female connective relationship. Each member 110, 130 can include a hollow, tubular portion. A push-button assembly 160, such as a spring-biased release mechanism, for locking and un-locking the pivot joint 100 in a plurality of positions, is connected to members 110, 130. The push-button assembly 160 includes an elongate shank 167 having a button 165 at one end of the elongate shank 167. The elongate shank 167 can include a groove 170 at the end opposing the button 165 of the elongate shank 167, as illustrated in FIG. 2. A lobed member 175 is attached to the first end of the shank 167 and a retainer member 185 is positioned in communicating relation with the elongated shank 167, such as within the groove 170, so as to secure the lobed member 175 on the elongate shank 167. A biasing member 172 is positioned between the button 165 and the second joint member 130. The lockable pivot joint 100 can pivotably join separate members of a variety of devices, such as shaft members of foldable measuring devices.

The first joint member 110 includes at least one blade 120 extending therefrom, as well as a first end 115a and an opposing second end 115b, as illustrated in FIGS. 1 and 2. An angle θ, such as about a 90° angle, is formed between the blade 120 and the first joint member 110, as illustrated in FIG. 2. The blade 120 includes a depressed surface 125 having a shape or configuration that is substantially the same as the lobed member 175. A hole 126 extends through a portion of the depressed surface 125. The lobed member 175 can be removably positioned within the depressed surface 125.

The second joint member 130 includes a first end 140 and an opposing forked second end 150, the forked second end 150 being configured for receiving the blade 120 of the first joint member 110, e.g., in a male-female connective relationship. The forked end 150 of the second joint member 130 includes a plurality of tines, such as a first tine 152 and a second tine 156, between which the blade 120 of the first joint member 110 can be positioned, as illustrated in FIGS. 1, and 3A-3C. The first tine 152 includes a first aperture 154 and the second tine 156 includes a second aperture 158. The second aperture 158 is large enough to allow the lobed member 175 to pass therethrough.

As mentioned herein, each member 110, 130 can include a hollow, tubular portion configured for receiving shafts S1, S2, respectively. For example, the shaft S1 can be inserted into the hollow portion of the first joint member 110 through an open, first end 115a of the first joint member 110 and the shaft S2 can be inserted into the hollow portion of the second joint member 130 through the open, first end 140 of the second joint member 130. The shafts S1, S2 can be held in place by any suitable securing means, such as a friction fit, between the shafts S1, S2 and the interior of the hollow portion of the first joint member 110 and the interior of the hollow portion of the second joint member 130, respectively.

The elongate shank 167 includes a generally cylindrical first section 166 and a generally cylindrical second section 168 extending from the first section 166. The second section 168 can have a diameter that is smaller than the first section 166, as illustrated in FIG. 2. The groove 170 is defined at an end of the second section 168 along an outer surface thereof, as illustrated in FIG. 2.

The biasing member 172 can be any suitable type of biasing member, such as a spring, abutting the button 165 and the first tine 152 of the second joint member 130.

The lobed member 175 can be formed from any suitable material, such as metal or plastic, and may have any suitable shape or configuration to allow the pivot joint to be locked at a desired angle. For example, the lobed member 175 can have a generally square configuration with rounded edges, as depicted in FIG. 2. Such a generally square configuration can allow the pivot joint 100 to be locked in four different positions, each position varying about 90° from an immediately preceding position. It is to be understood that configuration of the lobed member 175 can be varied to allow the pivot joint 100 to be locked at other predetermined angles. For example, a generally pentagonal configuration may allow the pivot joint to be locked at five different positions, each position varying about 72° from an immediately preceding position, a generally hexagonal configuration may allow the pivot joint to be locked at six different positions, each position varying about 60° from an immediately preceding position, and a generally octagonal configuration may allow the pivot joint to be locked at eight different positions, each position varying about 45° from an immediately preceding position. Further, a gear or a substantially cogged configuration having a plurality of teeth (not shown) may allow the pivot joint 100 to be locked in a plurality of positions of varying degrees. The lobed member 175 includes a hole 177 configured for receiving the second section 168 of the elongate shank 167. Thus, the second section 168 of the elongate shank 167 extends through apertures 154, 158 and holes 126, 177.

The retainer member 185 can be any suitable type of retainer member, such as an "E" shaped retainer ring or a washer, configured for fitting onto the groove 170 at the end of the elongate shank 167 once the second section 168 has been inserted through the aperture 177 of the lobed member 175, as discussed further below. The retainer member 185 can prevent, such as substantially prevent, the lobed member 175 from disengaging the second section 168 of the elongate shank 167. It is to be understood that the retainer member 185 can also include a cotter pin (not shown) that can be inserted through an opening in the second section 168 of the elongate shank 167 to prevent disengagement of the lobed member 175 from the second section 168 of the elongate shank 167.

The lockable pivot joint 100 can be manufactured by machining, casting, or 3D modeling, for example. The pivot joint 100, such as the first joint member 110, the second joint member 130, the button 165, and the elongate shank 167 can be formed from any type of suitable material, such as metals, alloys, or plastics.

By way of operation, the blade 120 of the first joint member 110 is inserted between the first tine 152 and the second tine 156 of the second joint member 130, such that the hole 126 of the blade 120 of the first joint member 110 aligns with both the aperture 154 of the first tine 152 and the aperture 158 of the second tine 156 of the second joint member 130. Once the biasing member 172 is positioned around the elongate shank 167, the elongate shank 167 may be inserted through each aperture 154 and 158. As such, the elongate shank 167 extends through the apertures 154 and 158, and the biasing member 172 is positioned between the button 165 and the first tine 152 of the second joint member 130, as illustrated in FIGS. 1 and 3A-3C. Once the depressed surface 125 of the blade 120 and the aperture 158 of the second tine 156 of the second joint member 130 are aligned, the lobed member 175 may be inserted through the aperture 158 of the second tine 156, and positioned in the depressed surface 125 of the blade 120. The retainer member 185 is removably positioned in the groove 170 to prevent accidental disengagement of the push-button assembly 160.

Figure 3A:
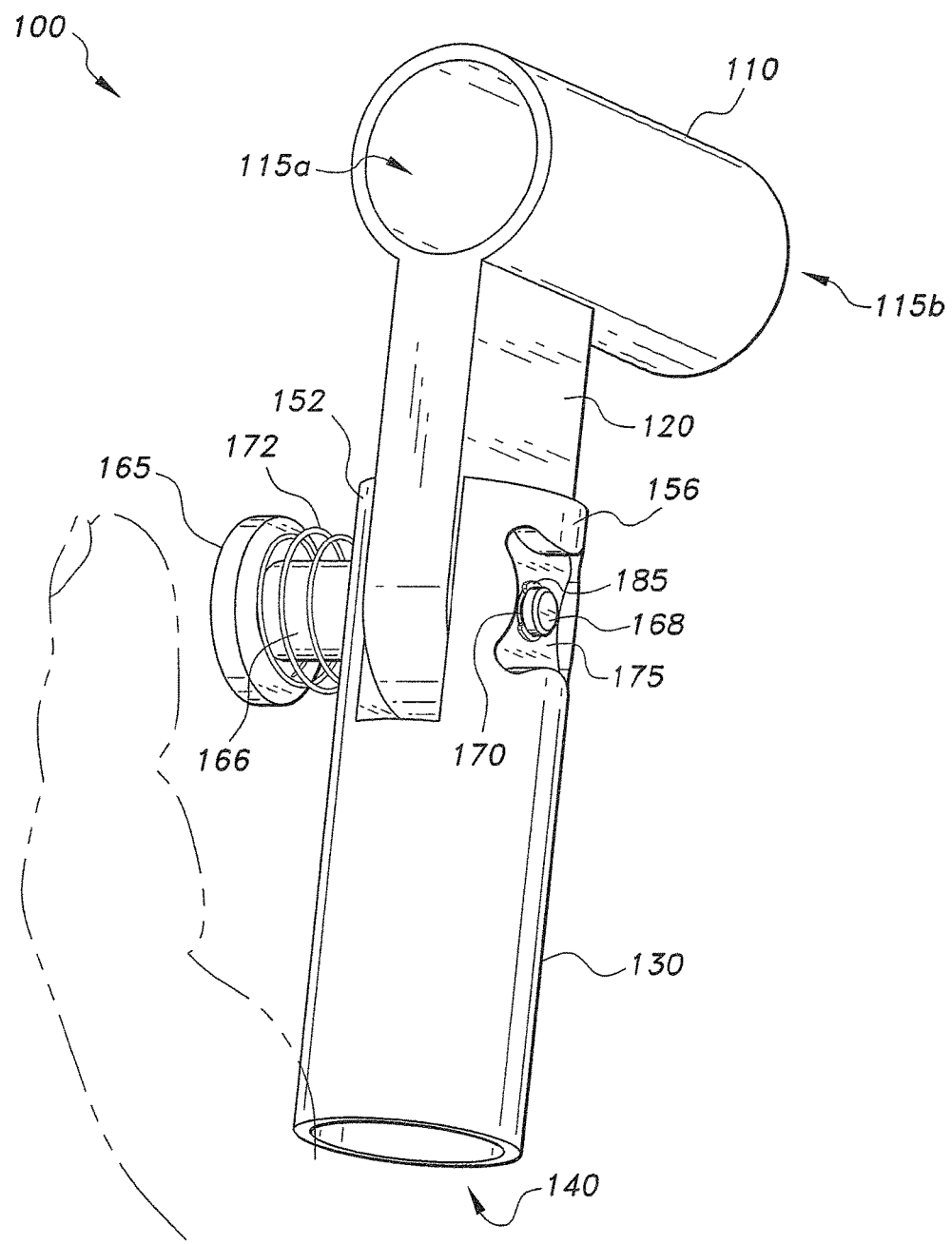
FIG. 3A illustrates an environmental, perspective view of the pivot joint in the "locked" position, according to the present invention.
Figure 3B:
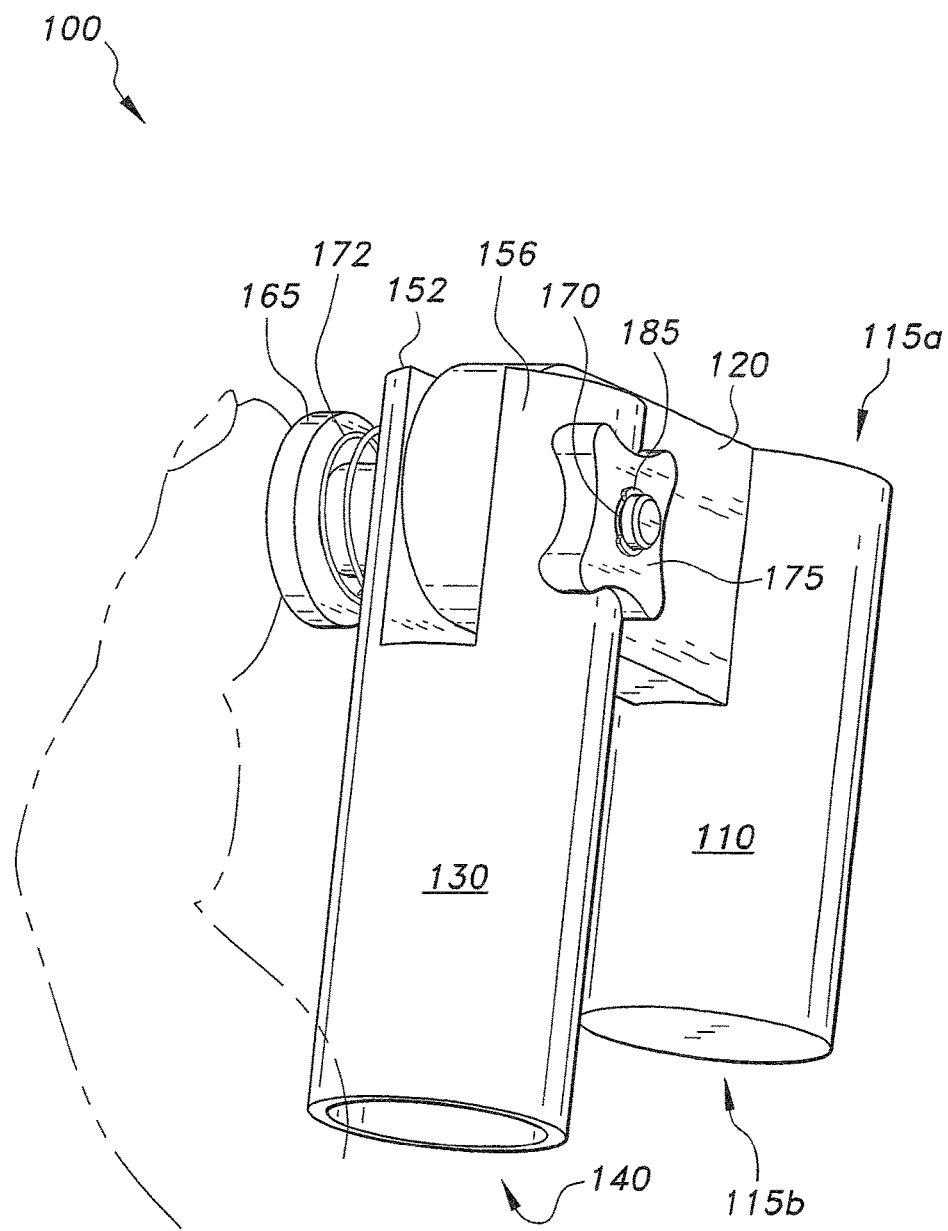
FIG. 3B illustrates an environmental, perspective view of the pivot joint in the "un-locked" position, according to the present invention.
Figure 3C:
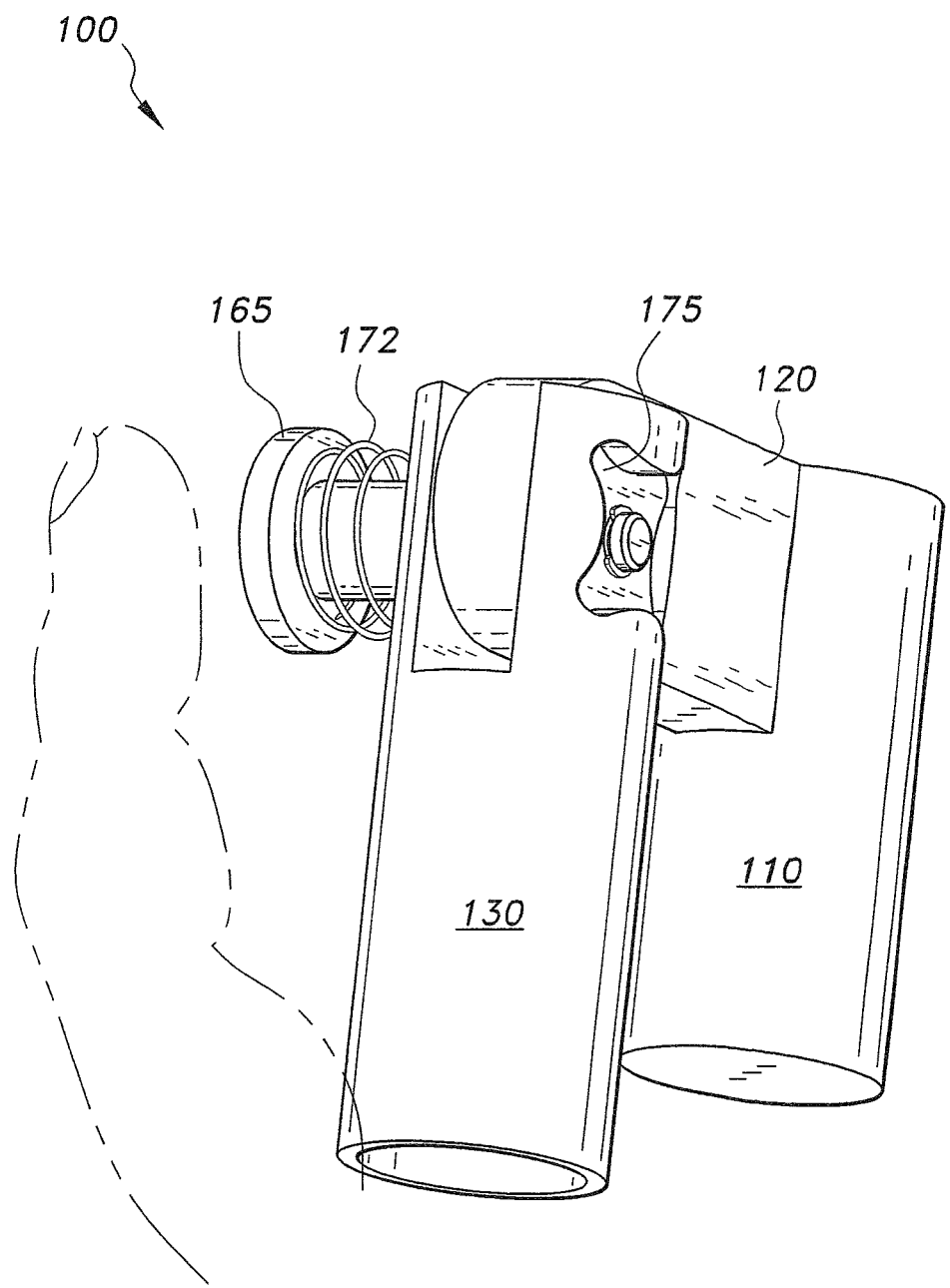
FIG. 3C illustrates an environmental, perspective view of the pivot joint in the "locked" position after adjustment of the pivot joint, according to the present invention.

The shaft members 110, 130 can be connected to the pivot joint 100, as described previously. The shaft members 110, 130 may be released from a locked position by depressing the button 165, as illustrated in FIG. 3B. When the button 165 is depressed, as illustrated in FIG. 3B, the elongate shank 167 pushes the lobed member 175 out of the depression 127 of the blade 120 of the first joint member 110 to allow free rotation between the shaft members 110, 130 relative to one another. After the shaft members 110, 130 reach the desired angle relative to one another, the button 165 may be released. The force of the biasing member 172 will pull the lobed member 175 into the depression 127 of the blade 120 of the first joint member 110 to lock the pivot joint 100 into position, as illustrated in FIG. 3C.

It is to be understood that the present invention is not limited to the embodiments described above, but encompasses any and all embodiments within the scope of the following claims.

We claim:

1. A locking pivot joint, comprising:
   a push-button assembly including:
      an elongate shank having a button at one end thereof,
      a lobed member having a plurality of intersecting sides and a hole extending through a central portion thereof, the elongate shank extending through the hole, and
      a retainer member positioned in communicating relation with the elongate shank to secure the lobed member on the elongate shank;
   a first joint member including a blade, the blade having a depressed surface and a hole extending through a portion of the depressed surface, wherein the depressed surface is dimensioned and configured to engage and retain the lobed member therein;
   a second joint member having a forked end, the forked end including a first tine and a second tine, the blade of the first joint member being disposed between the first and second tines, the first and second tines each including an aperture defined therethrough and configured to be aligned with the blade hole, a portion of the elongate shank extending through the first and second tine apertures and the blade hole; and
   a biasing member positioned between the button and the first tine;
   whereby the first and second joint members can be pivotally rotated about the elongated shaft while the button is depressed against the biasing member thereby disengaging the lobed member from the depressed surface and upon reaching the desired angle between first and second joint members the button is released thereby allowing the biasing member to pull the lobed member into engagement with the depressed surface and locking the first and second joint members in the desired angular position.

2. The locking pivot joint according to claim 1, wherein the elongate shank comprises a groove at the end of the elongate shank opposing the button.

3. The locking pivot joint according to claim 1, wherein the elongate shank comprises:
   a first section having a first diameter; and
   a second section extending from the first section, the second section having a diameter less than the diameter of the first section, the second section extending through the first and second tine apertures.

4. The locking pivot joint according to claim 1, wherein the biasing member comprises a spring.

5. The locking pivot joint according to claim 1, wherein an angle formed between the first joint member and the blade of the first joint member is about 90 degrees.

6. The locking pivot joint according to claim 1, wherein the lobed member includes at least four intersecting sides.

7. The locking pivot joint according to claim 6, wherein the lobed member includes four intersecting sides, the intersections of adjacent sides being rounded.

8. The locking pivot joint according to claim 1, wherein the first joint member includes a hollow portion configured for receiving a first shaft therein.

9. The locking pivot joint according to claim 8, wherein the second joint member includes a hollow portion configured for receiving a second shaft therein.

\* \* \* \* \*